United States Patent [19]

Andre et al.

[11] Patent Number: 5,242,262

[45] Date of Patent: Sep. 7, 1993

[54] PROCESS AND MACHINE FOR MAKING BATCHES OF SHEETS FROM A TOP OF A PILE

[75] Inventors: Claude Andre, Romanel; Jean-Luc Cachin, Crissier, both of Switzerland

[73] Assignee: Bobst SA, Switzerland

[21] Appl. No.: 683,335

[22] Filed: Apr. 10, 1991

[30] Foreign Application Priority Data

Apr. 10, 1990 [CH] Switzerland ............... 01219/90

[51] Int. Cl.[5] ..................................... B65G 59/02
[52] U.S. Cl. ........................... 414/796; 414/786; 414/796.7; 414/797.2
[58] Field of Search ............... 414/786, 796, 796.6, 414/796.8, 797.2, 796.7

[56] References Cited

U.S. PATENT DOCUMENTS

| | | | |
|---|---|---|---|
| 3,371,803 | 3/1968 | Hosch et al. .................... | 414/796 X |
| 3,625,377 | 12/1971 | Bohannon et al. ........... | 414/797.2 X |
| 3,834,290 | 9/1974 | Nelson .............................. | 414/789.1 |
| 4,457,658 | 7/1984 | Meylan . | |
| 4,620,827 | 11/1986 | Sameshima et al. . | |
| 4,784,559 | 11/1988 | Kwasnitza ........................ | 414/796 |

FOREIGN PATENT DOCUMENTS

| | | |
|---|---|---|
| 1013156 | 8/1957 | Fed. Rep. of Germany . |
| 2533533 | 2/1977 | Fed. Rep. of Germany . |
| 2735721 | 2/1979 | Fed. Rep. of Germany . |
| 3419056 | 12/1984 | Fed. Rep. of Germany . |
| 2008614 | 1/1970 | France . |
| 2318089 | 2/1977 | France . |
| 2381701 | 9/1978 | France . |
| 1-64938 | 3/1989 | Japan .................................. 414/796 |
| 639045 | 10/1983 | Switzerland . |

OTHER PUBLICATIONS

*Patent Abstracts of Japan*, vol. 7, No. 287 (M-264)(1432) Dec. 21, 1983 of JP-A-58 162 447.
First page of UK Patent Application GB 2 092 116 dated Aug. 11, 1982.

*Primary Examiner*—Michael S. Hupper
*Assistant Examiner*—Janice Krizek
*Attorney, Agent, or Firm*—Hill, Steadman & Simpson

[57] ABSTRACT

A machine for creating a batch of blanks out of a pile of blanks and for removing the batch of blanks from the pile consists of a fixed stop positioned along one surface of the blanks, a jogging device disposed opposite the fixed stop, a movable stop positioned in a line with the fixed stop, a separating device arranged adjacent the fixed stop for engaging an upper surface of the pile to raise the pile to create a free space, a conveyor insert movable from a position outside of the pile into the free space for transferring the blanks raised by the separator out of the pile as a batch of blanks.

17 Claims, 12 Drawing Sheets

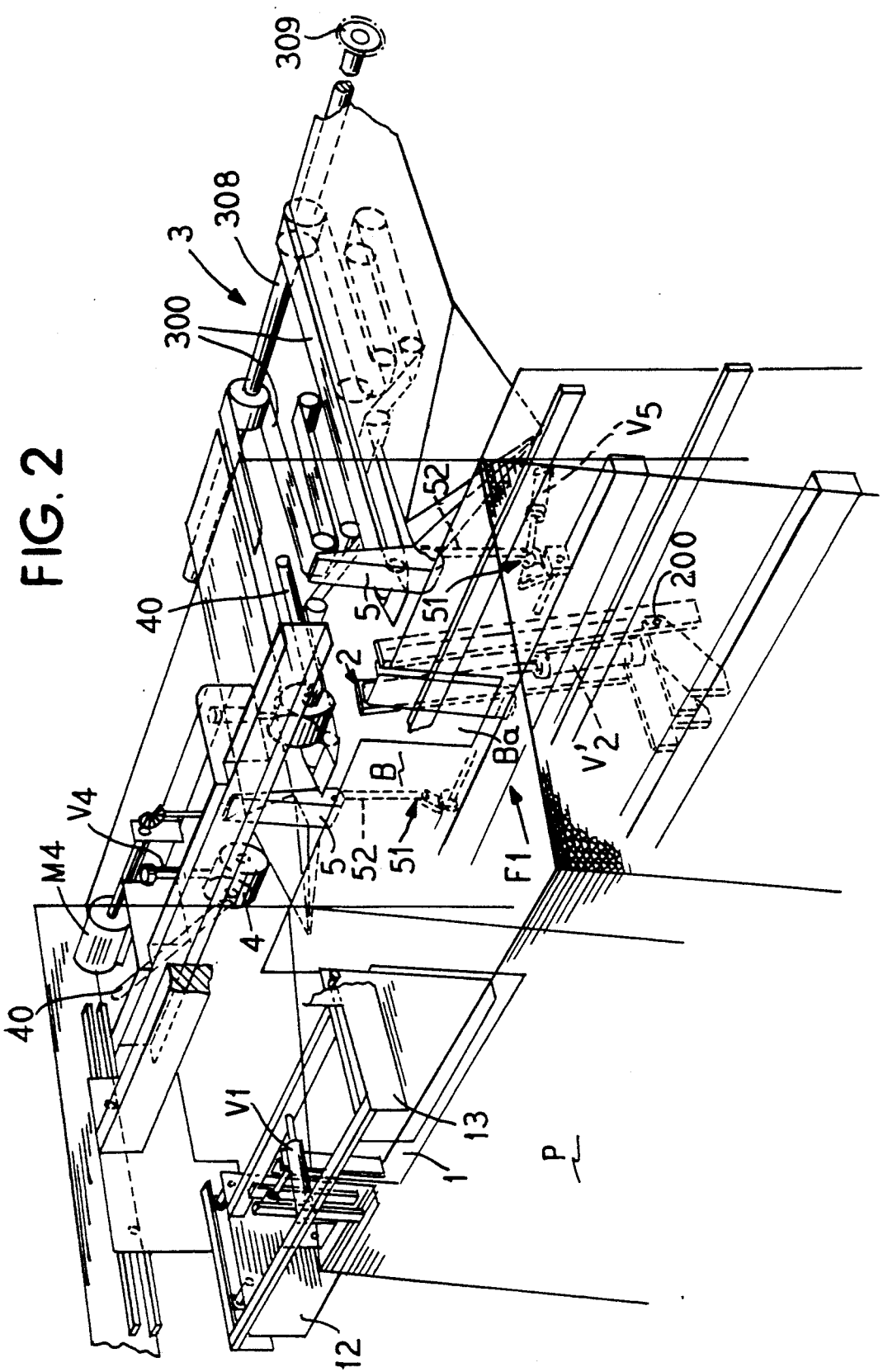

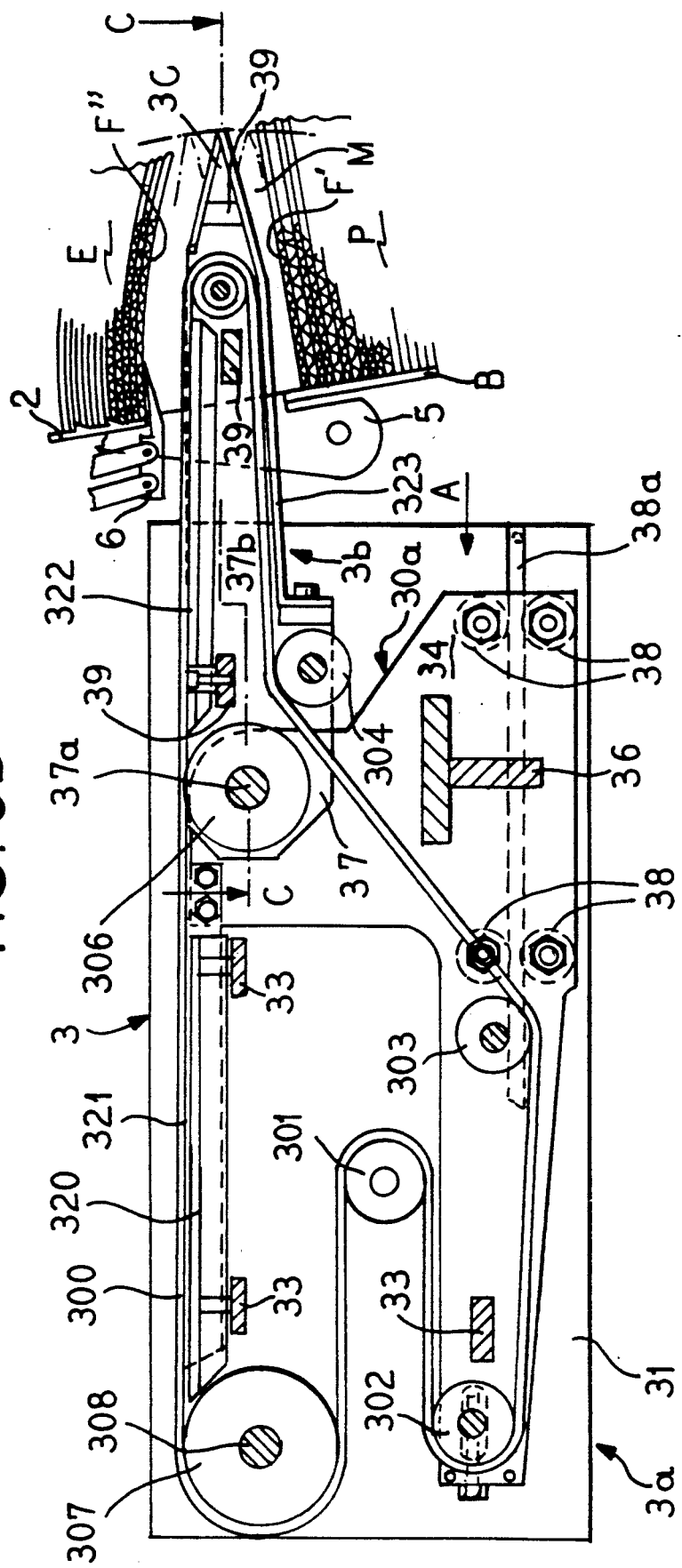

PROCESS AND MACHINE FOR MAKING BATCHES OF SHEETS FROM A TOP OF A PILE

BACKGROUND OF THE INVENTION

The present invention is directed to a device for separating a batch of sheets from a pile of sheets and then introducing the batch into a conveyor of a machine which is designated for processing the sheets.

For an easy understanding of the process known in the prior art, reference is made to FIG. 1, wherein an uppermost group of sheets of a pile P are separated as a batch E by means of a separator S, which will engage a rear edge of the group of sheets forming the batch E. The pile P is held in place on a front surface, which is a surface facing the transfer direction G for the batch E, as the batch, such as E', is carried away by a conveyor T, by a fixed lower stop Bi and a rotatable or tiltable stop Bs. After each transfer of the batch E from the pile onto the conveyor T, the pile P is raised by means of a pile elevator R so as to maintain the uppermost sheet of the pile at a constant level, which level of the uppermost sheet, above an upper edge x of the lower fixed stop Bi, determines the height of the batch E which will be subsequently removed. In order to separate the batch E from the pile P, the separator S is moved into engagement with a rear edge of the sheets and then moved upward so as to raise the batch so as to form a free space M between a lowermost sheet F" of the batch E and the uppermost sheet F' of the pile. With the raising of the sheets, a pressing member N is inserted to engage the sheet F' as a pusher H engages the rear edge of the batch E and will transfer the batch onto the belts forming the conveyor T as the pivotable stop Bs is moved from a blocking position, illustrated in bold lines, to a retracted position, shown in chain lines. In order to cause the movement of the stop, a belt arrangement C is provided and in order to hold the separator S against the rear side of the sheets forming the batch E, a piston or cylinder arrangement V is provided. This type of device is disclosed in U.S. Pat. No. 4,457,658, whose disclosure is incorporated herein by reference thereto and which claims priority from a Swiss Patent Application which issued as Swiss Patent A 639045.

This process, which is generally known, has the drawback that in the event the front edge of the lowermost sheet F" of the batch E is not released from the fixed lower stop Bi after the upward tilting or lifting of the movable stop Bs and the batch E is pushed by the pusher H toward the conveyor system T, the sheet F" will either bend upward, in which case it will impair the batch evenness which is a required item for subsequent conveyance, or will bend downward, in which case it will provide very strong resistance to the advance movement of the pusher H, which resistance is likely to seriously hamper the operation of the machine in addition to causing the destruction of this particular sheet.

FIG. 1 is an illustration of the difficulty involved with choosing a contact point y for the separator S touching the rear of the pile P, which point should correspond exactly to a point x which is the level up to which the lower front stop Bi will prevent the sheets of the pile from being moved forward. In fact, on account of deformation of the sheets, especially those lying on top of the pile P, the height of the pile will only very seldom be even throughout its entire width or cross section. Since the separator S does not take this unevenness into account, this unevenness is likely to become a cause of serious troubles. This means that the separator S might separate the rear edge of the sheet F", whose front edge is not engaged with the upper edge x of the lower stop Bi, in which case the sheet F" can be shifted by the pusher H toward the conveyor system T. However, the separator can also separate the rear edge of a sheet F", whose front edge is still engaged with an upper edge x of the lower stop Bi, in which case, as commented above, the lower sheet cannot be easily removed from the pile by the pusher H and will cause problems.

SUMMARY OF THE INVENTION

Consequently, the present invention has, for its purpose to enable the realization of the process and a machine designed for making batches of sheets taken from a top of a pile, which machine and process operates reliably, precisely and without trouble and prevents the lowermost sheet of the batch, when being laid on the conveyor system, from remaining engaged with the lower stop. To state the objects in a different manner, the invention is directed to a method and device which enables a dependable separation between the sheets which are to make up the batch to be shifted and those sheets which are to remain on the pile.

To accomplish these goals, the present invention is directed to a process for removing a batch of sheet-like workpieces or plates from the top of a pile of plates or sheet-like workpieces and transferring the batch into the infeed station of a machine for processing the plates or sheet-like workpieces, said process including steps of holding the pile along one side, which is facing the direction of transfer for the batch of sheets, jogging a rear edge of the pile in the upper regions where the batch is to be formed, engaging a front surface of the pile with a separator adjacent the upper regions to engage the lowermost sheet in the batch to be formed, shifting the separator upward to create a free space between the lowermost sheet of the batch and the next sheet of the pile, inserting an end of a conveyor system into said free space with said system engaging the lowermost sheet in the batch to convey the batch out of said pile as the front edges of the sheets forming the batch are released by the separator.

To accomplish the above process, the present invention is directed to an improvement in a machine for creating batches out of a top of a pile of sheets and transferring said batches from said top of said pile, said machine including a pile elevator, a fixed front stop, a removable front stop positioned above said fixed front stop and movable from a position stopping the passage of the batch to a position allowing passage of the batch, and a conveying system for transferring a batch from the top of said pile over a top edge of the fixed stop onto a conveyor, the improvements are the separator being situated adjacent the front stop, a jogger being positioned for engaging the rear edges opposite the separator of the top of the pile, and the conveying means being an end of the conveyor system being shiftable between a first position disposed adjacent an upper edge of a fixed stop and a second position inserted in a free space created by actuation of said separator.

Other advantages and features of the invention will be readily apparent from the following description of the preferred embodiments, the drawings and claims.

BRIEF DESCRIPTION OF THE DRAWINGS

FIG. 2 is a perspective view with portions removed for purposes of illustration of the improved machine of the present invention;

FIGS. 3A–3E are sectional views presenting the machine at different stages when producing batches, with FIG. 3A being a side view illustrating the positioning of the pile; FIG. 3B being an enlarged side view showing the construction of the separator; FIG. 3C an enlarged view showing the mechanism for inserting a safety pin of the separator; FIG. 3D being a cross sectional view of the conveyor means for removing the batches; and FIG. 3E being a schematic view of the conveyor means beginning the removal of a batch;

DESCRIPTION OF THE PREFERRED EMBODIMENTS

Figure 1:
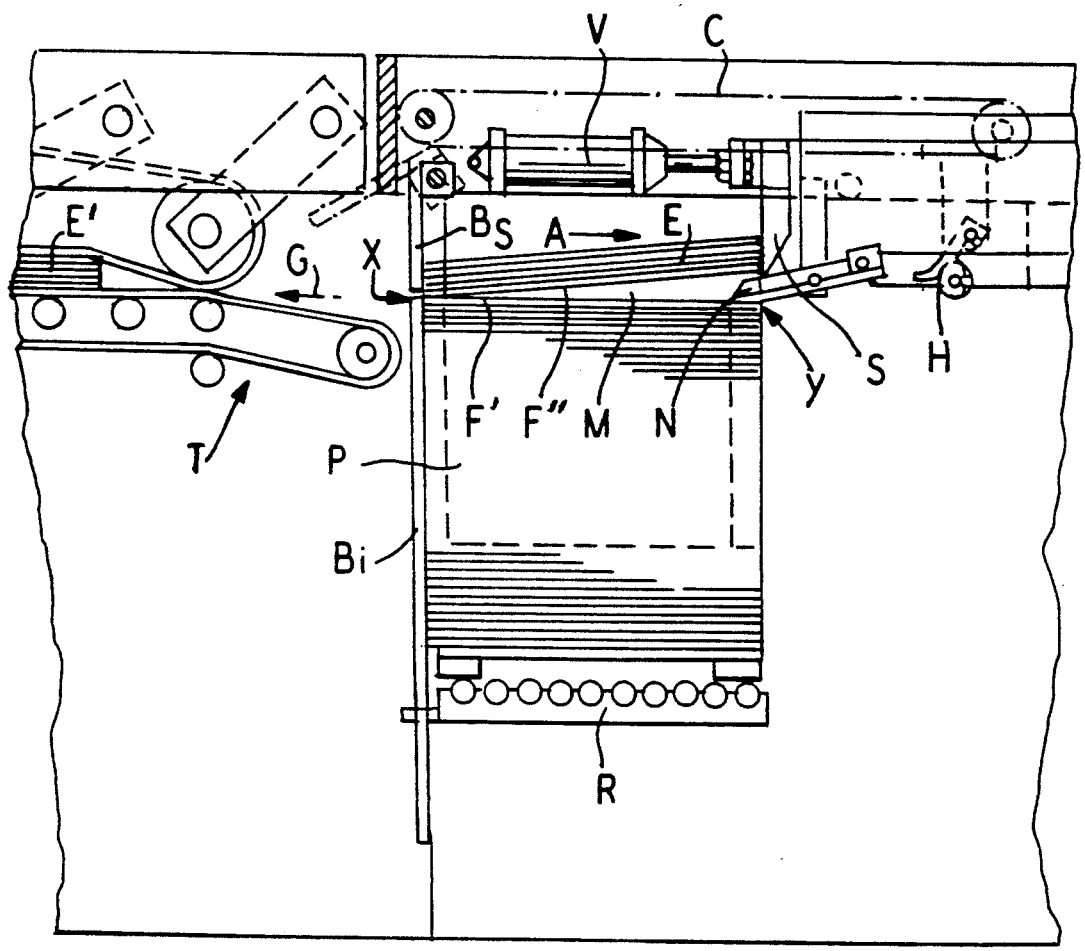
FIG. 1 is a side view with portions broken away for purposes of illustration of a prior art device for separating a batch of sheet-like material from a top of a pile and transferring the batch into a conveyor system for transfer away from said pile.

The principles of the present invention are particularly useful in a device illustrated in FIG. 2, which includes a fixed stop B for engaging a front surface of a pile P, a batch separator, generally indicated at 2, which is situated in the top center of the front stop B, two removable and tiltable flaps 5, which are situated on either side of the separator 2 and are positioned exactly above an upper edge of the fixed stop B, a movable rear jogger 1, a conveyor system, generally indicated at 3, which is positioned adjacent the front surface of the pile P and is constructed to insert ends of belts 300 into the pile in the vicinity of flaps 5 and two pressure rollers 4, which are situated above a batch being removed from the pile.

Figure 3A:
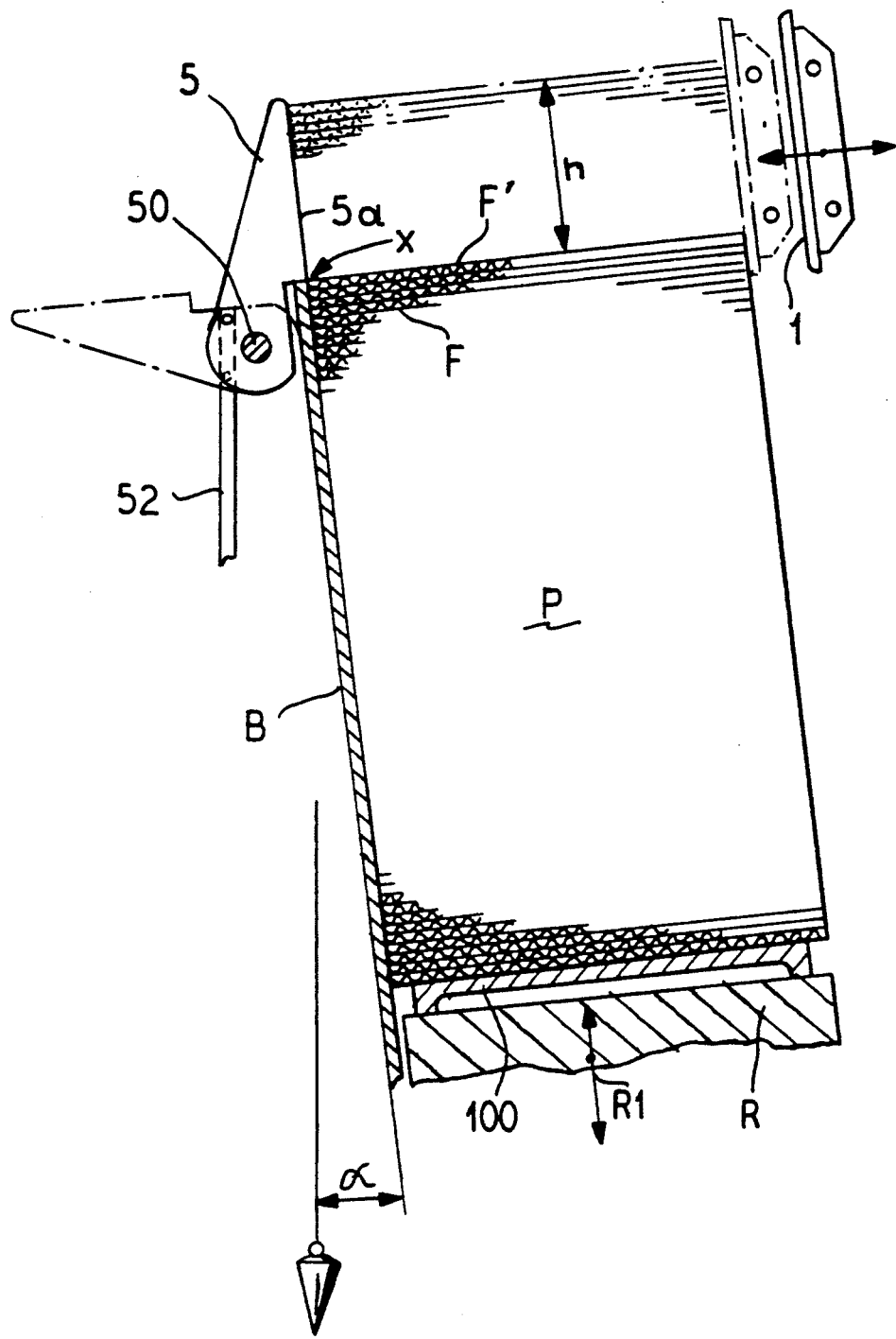

In FIG. 2, the top of a pile P will be shifted against the top portion of the stop B, which is the direction of the arrow F1. As illustrated in FIG. 3A, the pile P of sheets F are provided on a pallet 100, which itself rests on a pile elevator R so that the pile can be raised and lowered in the direction of the double arrow R1. As illustrated, the pile P rests against the stop B, which is positioned at an angle $\alpha$ of approximately 7°. The front surface of the pile is held steady by the fixed front plate or stop B, which has an upper edge x which is at the same level as the uppermost sheet F' of the pile at the beginning of the formation of a batch E.

The upper end of the stop B, which is presented as a plate of an appropriate shape, extends throughout the width of the pile P and is extended by two upper stops having the shape of tiltable flaps 5 of a small width. Each of the flaps 5 can tilt around an axle 50, which is mounted on a front surface of the fixed stop B. The flaps 5 can rotate on the axle 50 from a first position, illustrated in full lines, to a second position, shown in chain lines in FIG. 3A. This rotation is accomplished by a jack V5 (FIG. 2), which acts on the system 51 of levers and rods with a connecting rod acting on each of the flaps.

When a build-up or creation of a new batch E is desired, the pile P is raised by means of the pile elevator R (see FIG. 3A) so that the pile P will extend above the upper edge x of the front stop B by a height h which is to be equal to the height of the batch E to be created. The height h can be equal to or less than the height of the flaps 5.

In practical use, the height h of the batch E is determined by an angular coding device (not shown), which jointly acts with a microprocessor of an electronic machine control. The microprocessor is fed data, such as the total height of the pile P when fed into the machine, for example before the first batch is removed, the average thickness of the sheets, the number of sheets wanted in each batch and the approximate number of sheets for the last two batches. This process will then allow a command to move the pile elevator R subject to the number of consecutive moves necessary for fulfilling the conditions of the beginning and related to the various batches to be created.

With the pile raised, as shown by the broken lines in FIG. 3A, the upper end of the front edge of the pile P is held in place by the two flaps 5. At this stage, the movable rear jogger 1 is shifted by a jack V1 (see FIG. 6) from a first position shown in FIG. 3A in full lines to a second position shown with broken or chain lines, so as to have its supporting side put into contact with the upper end of the rear edges of the pile P. As a rule, the supporting side of the rear jogger 1 extends over a large part of the width of the pile P as well as over a height of the pile, which height is to be equal to one of the batches E to be created.

Figure 6:
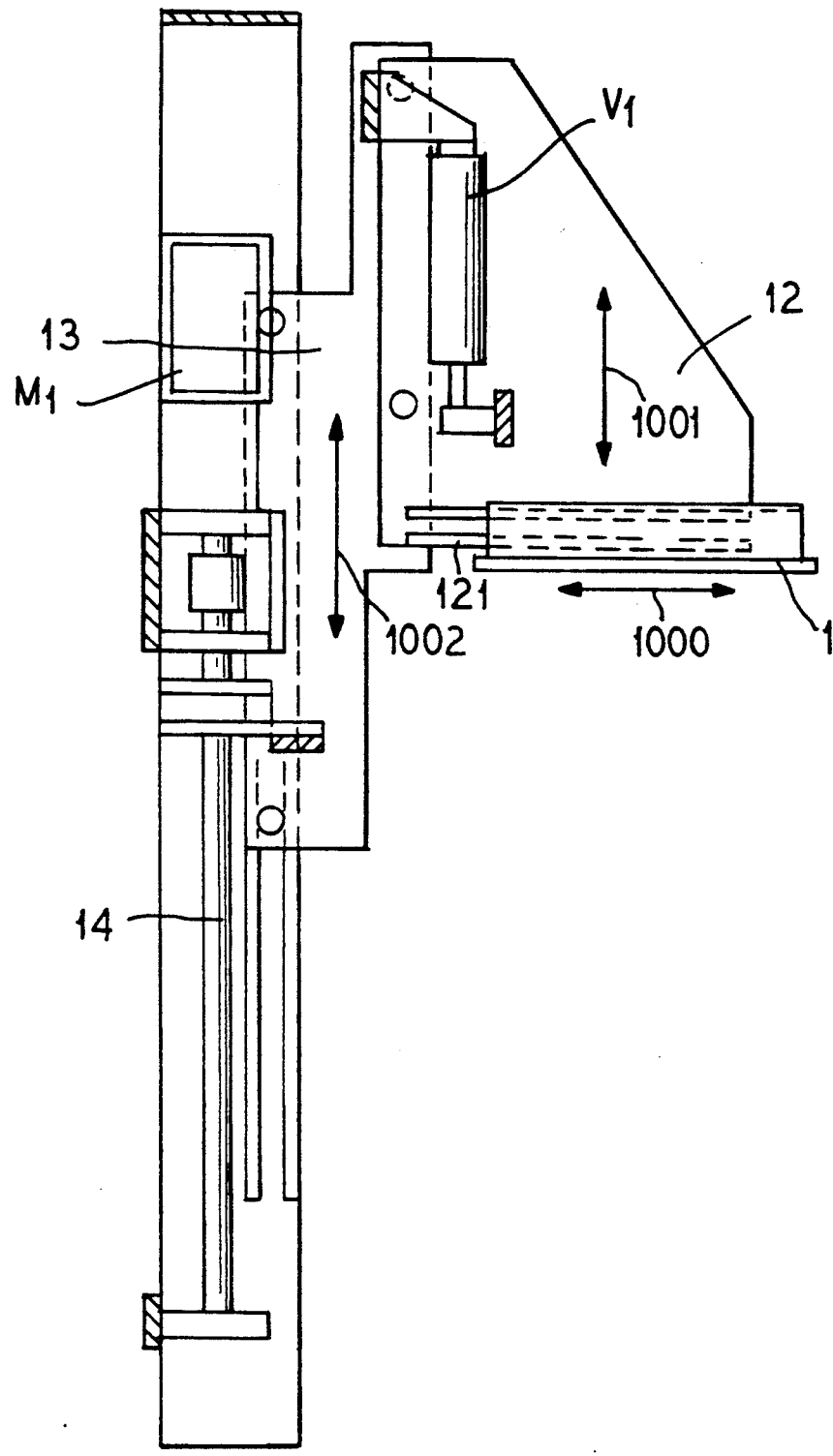
FIG. 6 is a cross sectional view with portions in elevation through the rear jogger structure.
Figure 7:
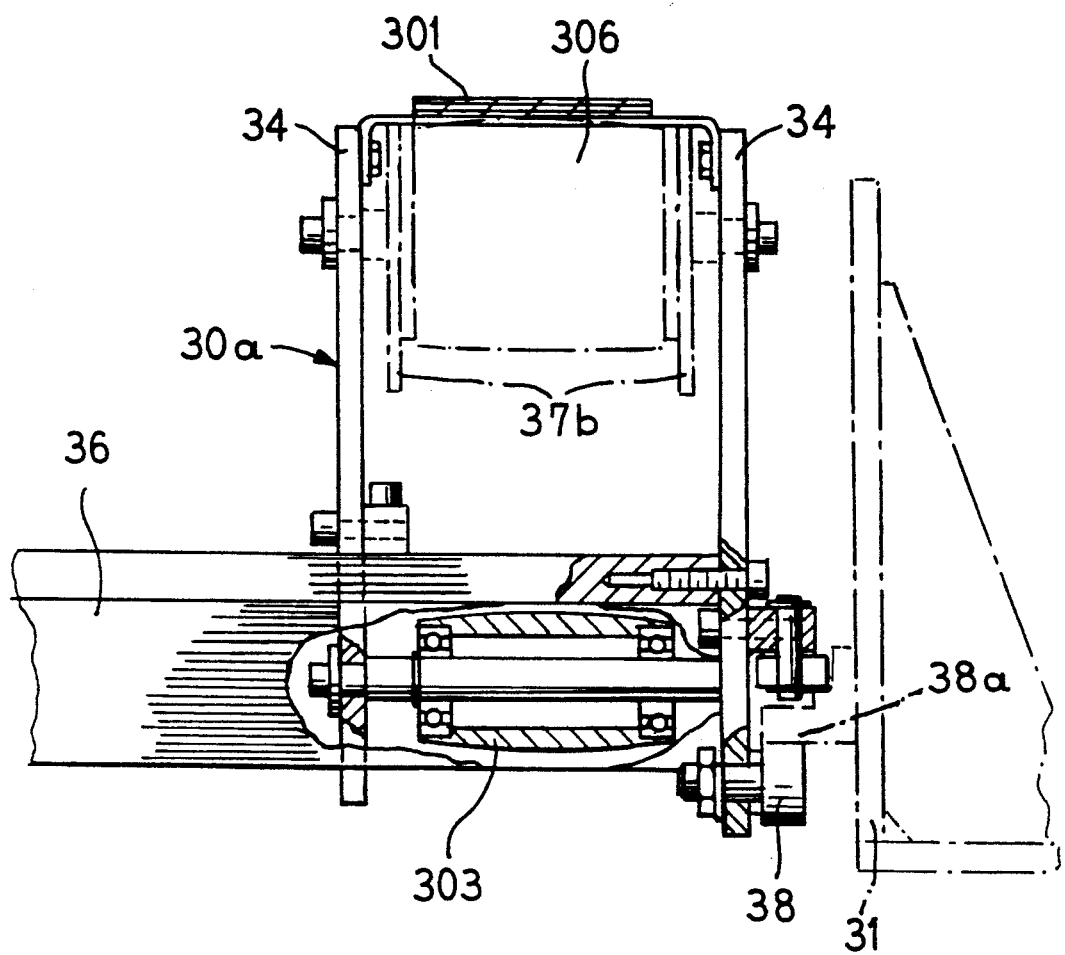
FIG. 7 is a view taken along the direction of arrow A of FIG. 3D with portions broken away for purposes of illustration.
Figure 8:
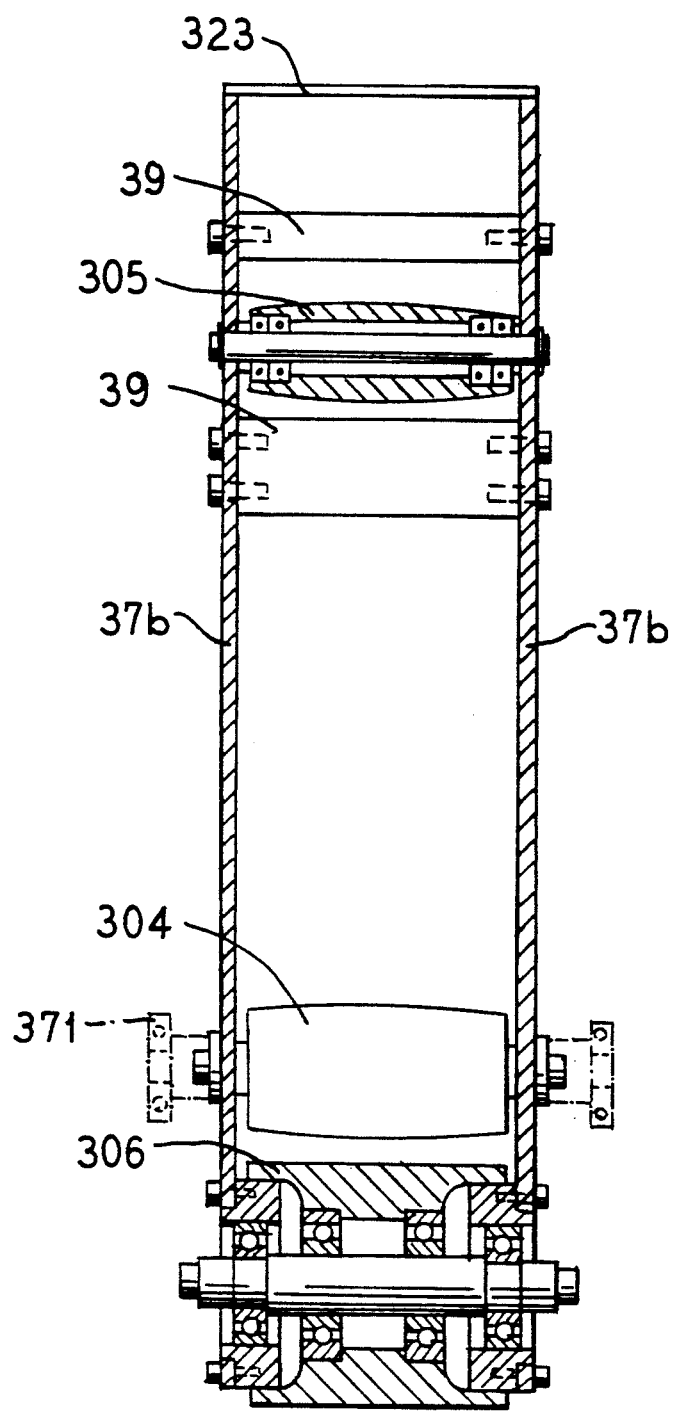
FIG. 8 is a cross sectional view taken along the lines C—C of FIG. 3D.

Preferably, the rear jogger, as shown in FIG. 6, is mounted for appropriate vertical adjustability illustrated by the arrow 1000 in a track 121 on a first carriage 12. The first carriage 12 is movable in tracks relative to a second carriage 13, as indicated by the arrow 1001 with the help of the jack V1. The second carriage 13 can be moved in a frame in the direction of arrow 1002 by means of a motor M1 and a screw and nut arrangement 14. This enables positioning the jogger 1 at various distances from the fixed stop B to compensate for the different sizes of the sheets F forming the pile P.

Figure 3B:
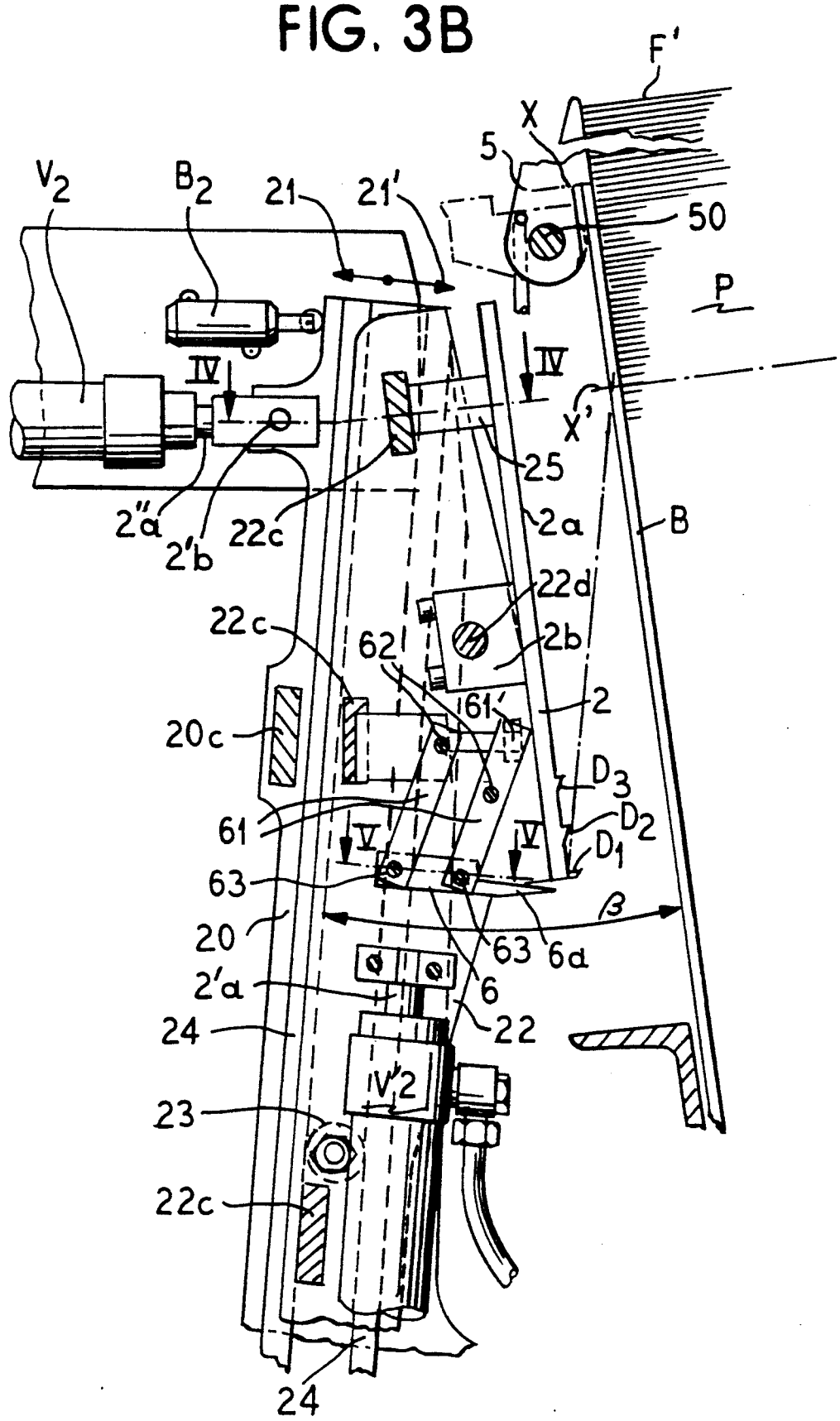

When the pile P has been raised so the uppermost sheet F' is above the level of edge x, as illustrated in FIG. 3B, a batch can then be removed from the pile. To accomplish this, the separator 2 is to be arranged adjacent a front center of the pile P and slightly lower than the upper edge x of the front stop B. As illustrated in FIG. 2, the separator 2 is positioned at a gap or cut-out portion Ba provided in the stop B.

The separator 2 has a contact surface 2a (see FIG. 3B) with a relatively small width, for instance 10 cm. The height of the contact surface, though, is at least equal to the height h for the batch E to be created.

Figure 4:
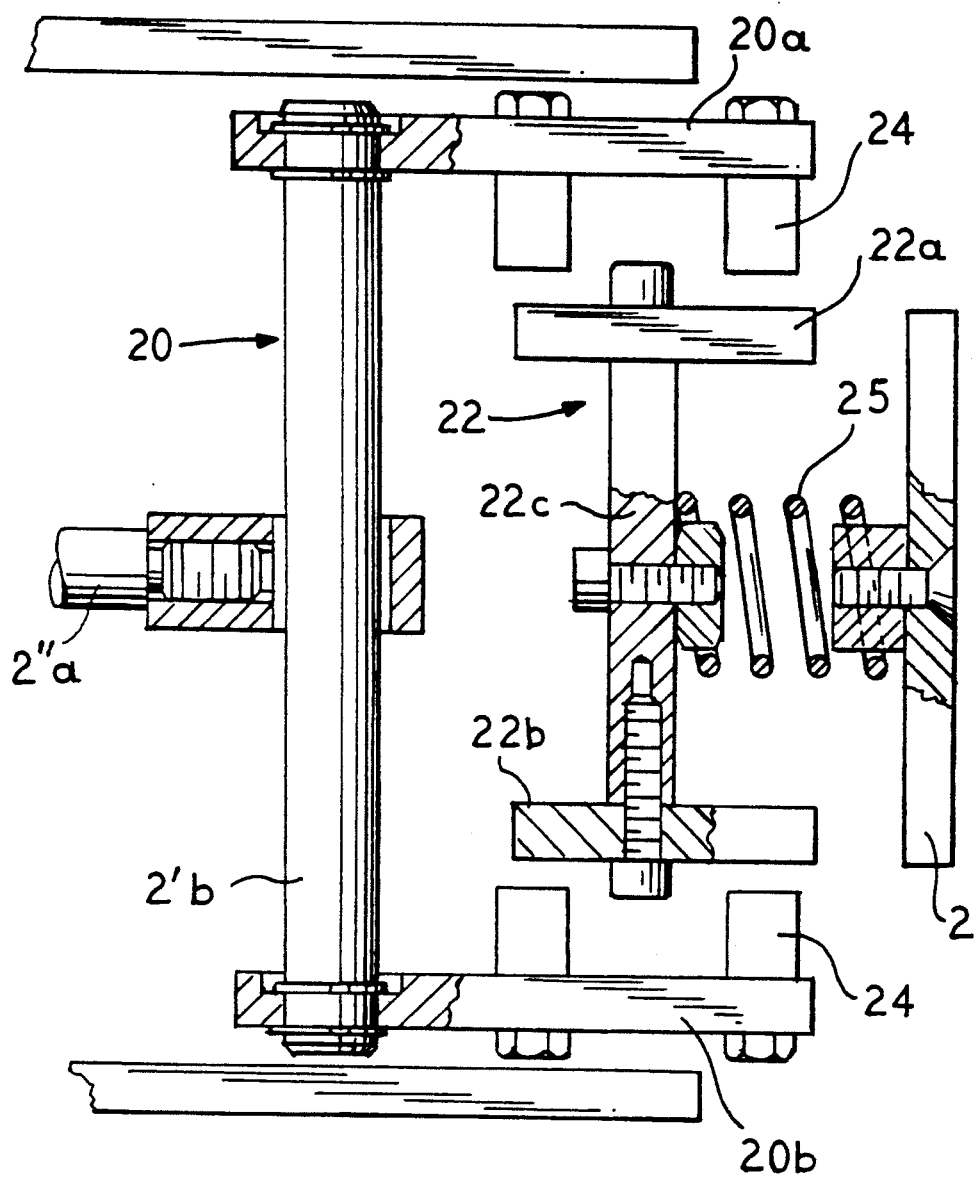
FIG. 4 is a cross sectional view with portions in elevation taken along the lines IV—IV of FIG. 3B.

In front of the pile P, a vertical, extendable main support 20 is provided with the possibility of being tilted by means of a jack V2 (see FIG. 3B) around an axle 200 (see FIG. 2) situated at the lower end so that the member can be shifted in the direction of arrows 21 and 21' (see FIG. 3B) from the rear to the front and back. An auxiliary support 22 is fitted with the possibility of vertical shifting by means of the jack V'2 on the main support 20. Rollers 23 are mounted on the auxiliary support 22 and are engaged in a track formed by rails 24 of the main support 20 to guide the auxiliary support 22 with regard to the main support 20. As can be seen in FIG. 4, the main support 20 consists of two plates 20a and 20b, which are connected to one another by means of an intermediate piece 20c (see FIG. 3B) of which only one is visible and by a rod 2'b (see FIG. 4). An outlet rod 2"a of the jack V2 is rotatably engaged with the rod 2'b so that the two plates 20a and 20b will be pivoted in the direction of the arrows 21 and 21' by the jack V2. The auxiliary support 22 situated between the two plates 20a and 20b of the main support 20 is also constructed of two plates 22a and 22b connected together by an intermediate piece 22c, with one of these plates being connected to the output rod 2'a of the jack V'2.

The lower end of the separator 2 is provided with several teeth D1, D2, D3, which are vertically arranged at regular distances from one another and extend throughout its width (see FIG. 3B). About mid-way in the length of the separator 2, it is provided with a bearing 2b holding an axle 22d, which is connected by its ends to the two plates 22a and 22b. Thus, the separator is able to tilt around the axle 22d with regard to the auxiliary support 22. The tilting movement of the separator is limited in one direction by its lower end coming in contact with edges of the two plates 22a and 22b of the auxiliary support 22 in accordance with the position which allows its contact surface 2a to be parallel with the front side of the pile P or parallel to the front stop B and in the other direction by a spring 25, which is arranged in the vicinity of the top of the separator 2 and acts between the separator 2 (see FIG. 4) and the crossbar 22c of the auxiliary support 22.

In order to have a new batch E created, the following operations are to be accomplished in the following order. Holding the main support 20 tilted forward, for example off the edge of the pile and in contact with an end stop B2 (FIG. 3B), so that the guiding direction of the rails 24 will form an angle $\beta$ of 12° with the front stop B. Then, the jogger 1 is moved forward so as to have its contact surface touch the top of the rear surfaces of the pile P as shown by the broken lines in FIG. 3A. Next, the separator 2 is raised by means of the jack V'2 so that the lowermost tooth D1 will touch the front edge or surface of the pile P at a height x', which is to be slightly lower than the edge x which is the upper edge of the front stop B. Next, the main support 20 is tilted toward the pile P so as to push the contact surface 2a of the separator 2 against the front surface of the pile P and, thus, engage the lower tooth D1 firmly with the sheet F''', which will, thus, become the lowermost sheet of the new batch to be created. After this, the separator 2, with or without previous interruptions, will be raised to create a free space M (see FIG. 3C) sufficiently large to allow a safety pin 6, as will be seen hereinafter, to be inserted underneath the point where the tooth D1 is engaged with the lowermost sheet F'' of the batch E. Attention should also be drawn to the fact that during this move, the parallelism between the contact surface 2a of the separator and the front surface of the new batch E is necessary for the maintenance of the correct engagement of the teeth D1, D2 and D2 with the new batch E, and this parallelism is insured by the pivoting action of the separator 2 around its axle 22d. The function of the two upper teeth D2 and D3 also consist in supporting the weight of the new batch E, which weight could be too heavy for it to be supported solely by the lower tooth D1, whose dimensions are reduced with a view of obtaining an easier engagement with the lowermost sheet F'' of the batch E.

Figure 3C:
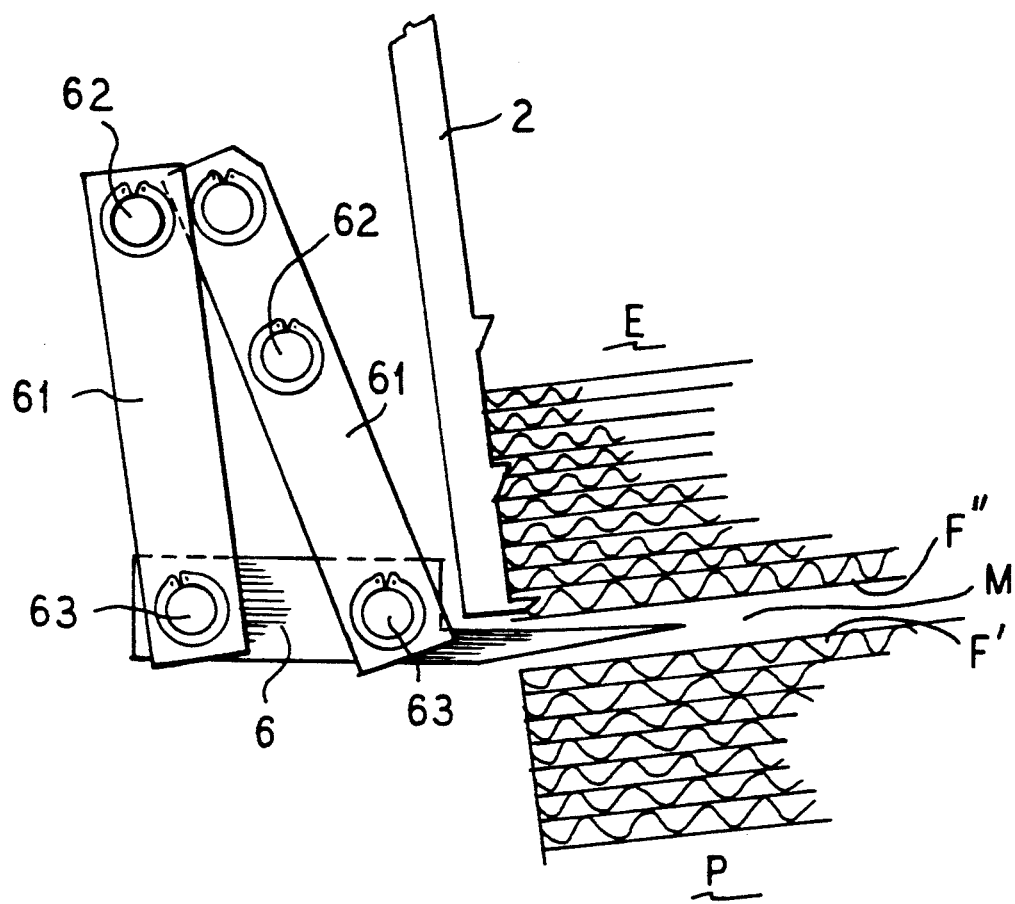

As shown in FIG. 3C, as soon as the batch E will have been raised slightly in the area of the separator 2, the safety pin 6 will be inserted into the free space M, which is still relatively small and exists between the pile P and the batch E.

The safety pin 6 is also mounted so as to be able to tilt on the auxiliary support 22 due to the joint action of four connecting rods 61, of which one end of every unit is fitted for free rotation on axles 62 of the same support 22 and the other end is connected to the safety pin by means of another axle 63. A jack V6 (see FIG. 3B) is mounted on the intermediate piece 22c of the support 22 and has an output rod coupled at a point 61' to one of the groups of connecting rods 61. The dimension and arrangement of the connecting rods are such that when the jack is actuated, the connecting rods will rotate around the respective axles 62 to create an essentially horizontal motion for the safety pin from a withdrawn position illustrated in FIG. 3B to an inserted position, such as illustrated in FIG. 3C. In the inserted position illustrated in FIG. 3C, the relatively thin tip 6a of the safety pin 6 will penetrate into the free space M. Moreover, the shape and dimensions of the pin tip 6a are to be designed rather small so that the pin tip can easily penetrate into the free space M in the beginning of the phase of the batch creation, i.e., at the movement when the batch E has only been raised a very small amount by the tooth D1 of the separator 2, but sufficient for the tip to be inserted. The tip will, thus, insure a reliable lift of the front edge of the batch E when the safety pin 6 and the separator 2, both driven by the auxiliary support 22, are moved upward. Thus, the safety pin 6 has the function to catch the front edge of the lowermost sheet of the batch E, which, with the two belts 300 being guided into the pile, might escape from the lower tooth D1 in the course of the upward motion of the separator 2.

Figure 5:
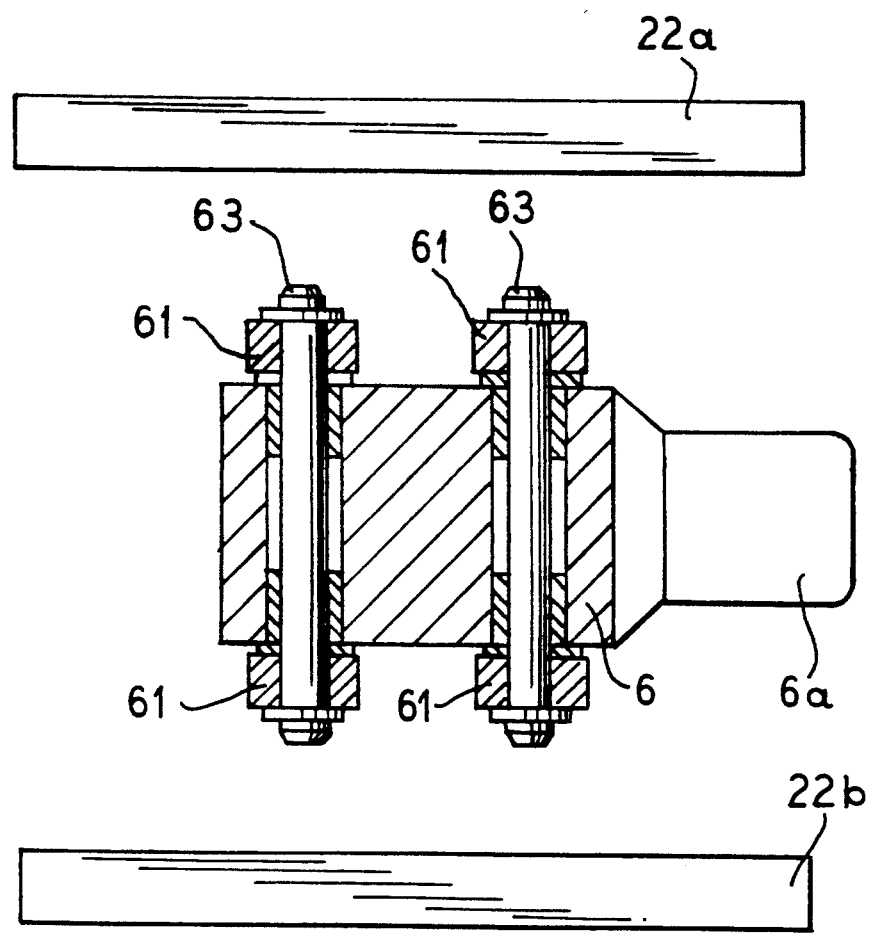
FIG. 5 is a cross sectional view with portions in elevation for purposes of illustration taken along the lines V—V of FIG. 3B.

As illustrated in FIG. 5, the connection between the connecting rods 61 to the pin 6 includes the bearings to allow free rotation as the pin 6 is moved between its various positions.

The conveyor system 3, as illustrated in FIGS. 2, 3D, 3E, 7, and 8 requires a free space M to be sufficiently large to allow the portion with the ends of the belts 300 to move into the space in order to remove the batch E with regard to the upper part of the pile P. The conveyance system 3 of the belts 300 is of a telescopic execution. For example, it has two parts, of which one is movable with regard to the other. Thus, the conveyance system 3 includes a fixed frame 3a which extends over the whole front width of the pile P and consists of two lateral plates 31 connected to one another by intermediate pieces 33. The system 3 is extended toward the pile P by two movable infeed fingers 3b, (only one is shown in FIG. 3D) which are situated opposite and on either side of the separator 2, which was described hereinabove.

Every infeed finger 3b includes a support 30a horizontally movable with regard to the fixed frame 3a. The movable support 30a consists of two plates 34 (see FIG. 7) which are connected to one another by an intermediate piece 36 (see FIG. 3d). Rollers 38 are fitted on each of the plates 34 that are adjacent the plates 31 to engage with corresponding guides 38a, which are on the fixed frame 3a to insure a proper guiding of the movable support 30a. The movable support 30a also carries a tiltable support 37 which consists of two plates 37b (best illustrated in FIG. 8), which are connected to one another by intermediate pieces 39. The support 37 can be tilted freely with regard to the movable support 30a around an axle 37a (FIG. 3D), which has ends that are fitted on the two plates 34 (see FIG. 7) of the movable support 30a. The support 37 is also provided with a roller 371 (see FIG. 8) which can engage guide rails provided on the plates, such as 31, of the fixed frame 3a, which guide plates allow free pivoting of the support 37 around the axle 37a and in a position which is practically horizontal.

The belt 300 is mounted in the fixed frame 3a, the movable frame 30a and the infeed finger 3b by several pulleys 301-307 in such a way that the belt will have a closed-circuit that is provided with the pulley, such as 301, for compensation of distance variations occurring with the shift of the support 30a with regard to the fixed frame 3a. For example, the pulleys 301 and 307 are mounted in the fixed frame 3a, whereas the pulleys 302, 303, 304, 305 and 306 are in the movable frame 30a.

The drive of the belt 300 is achieved by means of the pulley 307, which is mounted on the shaft 308, which has an end that is able to rotate freely in the two plates 31 of the fixed frame 3a. A similar pulley 307 is fitted on the shaft 308 of the belt for the second infeed finger 3b so as to insure an identical and simultaneous drive motion of the two belts 300 of the conveyance system 3, as may be gathered from FIG. 2, on which the shaft 308 is provided with a drive pulley 309 at one of its ends.

As illustrated in FIG. 3D, guiding plates 320, 321, 322 for the batch E and a guard 323 for the belt 300 are provided on the conveying system 3. The free end of every infeed finger 3b has an end piece 3c that extends beyond the last pulley 305 of the closed circuit and has a tapered shape destined to insure an easy insertion of the infeed finger 3b into the free space M of the pile P. The easy penetration will also be enhanced by the support 37 being freely tiltable upward from a horizontal position so as to only make sure that the lower side of the tapered end piece 3c will touch the front surface of the pile P. The support 37 will allow it to tilt upward, if necessary. Moreover, in order to obtain a simultaneous movement of the two shiftable supports 30a of every infeed finger 3b, the supports 30a are connected to one another by means of an intermediate piece 36, on which a jack or drive piston can be applied.

Figure 3E:
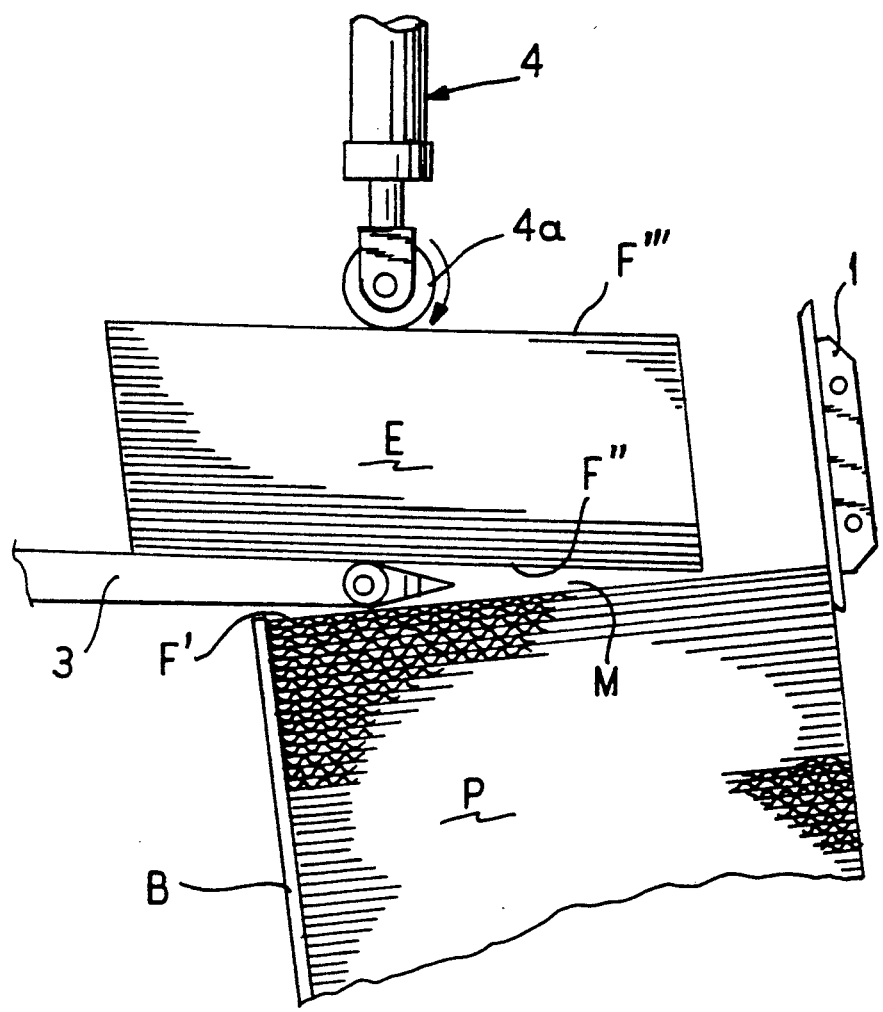

FIG. 3E illustrates the infeed finger 3b, at the end of its insertion into the free space M. At this stage, the following operation will be accomplished. A downward motion of the two pressure rollers 4 situated above the batch E and staggered crosswise is effected to exert pressure on the uppermost sheet F''' of the batch E. Both pressure rollers are rotated with an identical peripheral speed and in the same direction as the speed of the belts 300 so as to move the whole batch E forward. A backward tilting of the flap 5 is then accomplished in order to give a free forward movement for the batch E. Forward tilting of the main support 20 and a simultaneous lowering of the auxiliary support 22 will allow the batch E to descend and come to rest with its lowermost sheet F'' engaged on the belts 300 of the conveying system 3.

As shown by FIG. 2, every roller 4 is rotatable by means of a motor M4 and can be pushed toward the batch E by a jack V4. The shaft 40 has cardan joints to insure the rotation of the rollers 4.

When the batch rests on the belts 300 of the conveyance system 3 with almost the whole surface of its lowermost sheet F''', the pressure rollers 4 will be moved upward, since their action is no longer necessary for the batch E to be moved forward. Thereupon, the batch E is to leave the conveyance system 3 in order to be taken over by another conveyance appliance similar to that of the transport device T of FIG. 1. This device T will transfer the batch, for instance, into the feeder of a cutting press.

After the upward tilt of the flaps 5 and the rearward shift of the rear jogger 1, the pile P will be raised by means of the pile elevator R so that the uppermost sheet F1 will be at a level of the upper edge x of the front stop B. At this stage, the machine is ready to create a new batch.

Conspicuously, the batch build-up, as described above, involves the use of numerous detectors for monitoring the position of the movable items, for example the pile or the batch, or for determining the moment at which the uppermost sheet F' of the pile P is situated at the upper edge of the front stop B, the batch E rests adequately on the belts 300 of the conveying system 3, with its lowermost sheet F'' thus allowing the upward motion or the retracting of the pressure rollers 4; and that when the batch E leaves the conveyor system 3, etc. The process of creating batches as described above is, thus, an answer to the inherent problem, since the belt conveyor system 3 placed in the space M and situated between the new batch E and the pile P insures a clear distinction between the sheets which are to be retained on the pile and those contained in the batch E, which are to be conveyed forward. Moreover, since the sheets of the batch E are in a certain way pulled on their front surface and not pushed from behind, there is no longer any risk of undergoing deformation causing the break-up of the batch E that has been created.

On the machine described above, numerous variations can be added without overstepping the limits of the present invention. So, for instance, the belts can be replaced with rotating rollers. The conveying system 3 can include one or several belts and the pressure rollers 4 can be replaced by belts.

Although various minor modifications may be suggested by those versed in the art, it should be understood that we wish to embody within the scope of the patent granted hereon all such modifications as reasonably and properly come within the scope of our contribution to the art.

We claim:

1. In a machine having a pile elevator, a fixed front stop adjacent the pile elevator, a separator for engaging a portion of a pile of sheets on the elevator, and a conveying system for removing a batch consisting of an upper portion of the pile separated from the pile by the separator, the improvements comprising the separator being mounted in the machine adjacent the fixed front stop for engaging a first surface of the pile and creating a free space between a raised batch of sheets and a remaining portion of the pile, a jogger being positioned for acting on a rear surface of the pile opposite the first surface, and the conveying system being positioned adjacent the separator and having an end shiftable between a first position clear of the pile and a second position partially inserted in the free space between the raised batch and the remaining portion of the pile.

2. In a machine according to claim 1, wherein the conveying system includes a fixed first part and a second part shiftable relative to the first part in order to be able to penetrate into the free space.

3. In a machine according to claim 2, wherein the second part comprises a first support shiftable relative to the first part and a second support having a shape of a finger tiltable around a horizontal axis relative to the first support.

4. In a machine according to claim 3, wherein the conveying system consists of at least one belt being guided by a plurality of pulleys mounted on said first and second parts to form a closed circuit, one of said pulleys being arranged to compensate for the variations in spacing between the pulleys on both first and second parts during shifting of the second part relative to said first part.

5. In a machine according to claim 4, wherein a return pulley is situated adjacent a free end of the finger, which free end is provided with a tapering portion for insertion into the free space.

6. In a machine according to claim 1, wherein the separator includes a member having a first tooth adapted to engage a lowermost sheet of the batch, said member being mounted in a main frame which is pivotably mounted in said machine and and said member being movable toward said pile to form an angle of approximately 12° relative to the first surface of the pile as the tooth of the member engages a leading edge of the sheets.

7. In a machine according to claim 6, wherein said member includes a contact surface provided with auxiliary teeth situated above the first tooth.

8. In a machine according to claim 6, wherein the separator includes an auxiliary support mounted for essentially vertical on movement on said frame and being shiftable with said main frame until the first tooth engages a surface of the pile.

9. In a machine according to claim 1, wherein the separator includes a member having teeth for engaging edges of the pile to determine a lowermost sheet of the batch, said member being mounted in a frame for vertical movement to raise the batch from the pile, said separator including a finger-shaped pin with a tip, said pin being shiftable between a first position in which the tip is withdrawn from the pile to a second position with the tip extending into the free space created by the teeth of the member lifting the batch from the pile.

10. In a machine according to claim 9, wherein said member is supported on an auxiliary support and the pin is tiltable around an axis mounted on the auxiliary support.

11. In a machine according to claim 10, wherein the member is mounted for tiltable movement around an axle on said auxiliary support to enable parallelism of a surface of the member to the front stop.

12. In a machine according to claim 11, wherein the separator is tiltable between a first fixed position with the member being parallel to the front stop, which position is determined by contact of the separator member with said auxiliary support and a second variable position determined by a spring acting between an upper portion of the member and the auxiliary support.

13. In a machine according to claim 1, which includes pressure means acting on the top of the batch to hold the batch on the conveying system as the batch is shifted off of the pile, said pressure means being shiftable from a position engaging an uppermost sheet of the batch to a position withdrawn from the uppermost sheet.

14. In a machine according to claim 1, wherein the fixed front stop is slanted at an angle of about 7° with respect to a vertical plane, said fixed front stop having a movable upper portion shifted between a first position in which the upper portion engages the first surface of the pile and a second position in which the upper portion enables the forward shift of the batch off of said pile.

15. In a machine according to claim 14, wherein the upper portion of the front stop is mounted for rotation between the first and second positions on an axle mounted on a front of the front stop.

16. In a machine according to claim 1, wherein said jogger includes a rectangular plate mounted on a first carriage, said first carriage being mounted on a second horizontal carriage being shiftable to cause jogging of the pile, said second horizontal carriage being shiftable in a frame by means of a drive worm and motor to compensate for different size piles.

17. A process for creating a batch of a plurality of workpieces from a top of a pile of workpieces and for transferring the batch in a transfer direction extending perpendicularly to a first surface of the pile to a machine for processing the batch, said process including holding the pile on the first surface, jogging a rear surface of the pile in an upper portion of the pile, engaging an edge of a workpiece lying on the first surface of the pile in an upper part of the pile to create an engaged workpiece which is on the bottom of a batch with the number of workpieces in the batch being determined by the number of workpieces resting on the engaged workpiece, raising the engaged workpiece to create a free space between a lowermost workpiece of a raised batch and an uppermost workpiece of a remaining pile of workpieces, inserting an end of a conveying device into the free space, then releasing the engaged workpiece and operating the conveying device to transfer the batch in the transfer direction.

* * * * *